2,898,192

PRODUCTION OF BORIC ACID

Cameron G. Harman, Cleveland, Ohio, assignor to Horizons Incorporated, a corporation of New Jersey No Drawing. Application May 1, 1957
Serial No. 656,190

7 Claims. (Cl. 23—149)

This invention relates to the preparation of boric acid and boric oxide from crude borates. More particularly, it relates to a process in which the boron values are recovered from either crude or purified borates by a simple and direct sublimation process.

It has long been known that some compounds of boron could be converted to boric oxide by subjecting them to the action of steam. For example, in United States Patent 816,928, a process is described in which boron nitride is decomposed by means of steam. Others have described the decomposition of boron halides in similar fashion. The nitrides and halides of boron are, of course, much more susceptible to decomposition in the manner described than the much more stable boron-oxygen compounds represented by the borates.

The borates, however, represent the most plentiful and the most economical sources of boron. Many processes have been developed for the recovery of the boron in such borates, in relatively pure form as $B_2O_3$ or $H_3BO_3$, principally by the action of acids at elevated temperatures, as exemplified in United States Patents 809,550; 1,108,129; 1,308,577; 1,927,013; and 2,531,182, to enumerate but a few of those disclosing this technique.

I have now discovered a process by means of which suitable borates may be decomposed by the application of heat without the addition of any acids to the borate. Briefly, in the process devised by me such borates are moistened with water and then subjected to rapid heating to temperatures in the range between 300° F. and about 2000° F., or about the temperature at which the anhydrous borate fuses. For most processes temperatures between 300° F. and 750° F. are sufficient to achieve the removal of the major portion of the boron content of the treated metal.

I have further discovered that the foregoing decomposition may be greatly accelerated in the upper range of temperature by the addition of a small amount of an acidic oxide, silica being illustrative. Amounts of this additive of between about 15% and 40% of the weight of the material being treated have been found to be effective. It appears that other oxides such as: titania ($TiO_2$); alumina ($Al_2O_3$); and iron oxide ($Fe_2O_3$) will produce a similar beneficial effect in my process.

The borates to which my process applies include both naturally occurring minerals such as colemanite, or artificially produced industrial mixtures which contain substantial amounts of one or more alkaline earth borates in admixture with other compounds.

The following examples will illustrate more specifically certain aspects of my invention and are to be construed as illustrative rather than limitative.

Example I

A sample of powdered colemanite $$(2CaO \cdot 3B_2O_3 \cdot 5H_2O)$$

was moistened with water, about 25% of water by weight being intermixed with the powdered material. The moistened mixture was charged into a furnace maintained at about 1000° F. Almost immediately, dense white fumes began to issue from the moistened sample. The fumes were permitted to emerge from the furnace and were condensed on a cool metal plate interposed in the stack passage. The condensate was identified under a petrographic microscope as boric acid ($H_3BO_3$) and boric anhydride ($B_2O_3$). Upon continued heating, the amount of the white fumes gradually decreased to the point of cessation. Further spraying or injecting water onto the hot sample caused further evolution of the white cloud. Thus, by continued application of moisture in the form of water or steam, substantially all of the boron content in the sample could be separated therefrom as boric oxide and boric acids. A schematic illustration of the process could be as follows:

$$2CaO \cdot 3B_2O_3 \cdot 5H_2O + XH_2O \xrightarrow{\Delta} 2Ca(OH)_2 + 3(B_2O_3 \cdot 3H_2O) + (X-6)H_2O$$

Example II

Boric acid anhydride was produced by the process described in Example I, except that the charge was a moistened mixture of colemanite to which about 30 parts by weight of silica had been added for each 100 parts by weight of colemanite. The furnace temperature was 1900° F. It was observed that the white fumes of $B_2O_3$ were evolved much more rapidly than in Example I.

In this instance the silica appeared to modify the reaction above as follows:

$$2CaO \cdot 3B_2O_3 \cdot 5H_2O + SiO_2 + 4H_2O \rightarrow 2CaO \cdot SiO_2 + 3B_2O_3 \cdot 3H_2O \uparrow$$

Having now described my invention in the manner prescribed by statute, I claim:

1. A process for producing boric acid and boric acid anhydride which consists of: moistening an alkaline earth borate material with water, subjecting the moistened alkaline earth borate material to temperature within the range of 300° F. to 2000° F. while in contact with water vapor and in the absence of any extraneous added free acid and collecting the boron oxide and the boric acid evolved from the heated, moistened alkaline earth borate.

2. A process for producing boric acid and boric acid anhydride which consists of: moistening an alkaline earth borate material with water, subjecting the moistened alkaline earth borate material to temperature within the range of 300° F. to 750° F. while in contact with water vapor and in the absence of any extraneous added free acid and collecting the boron oxide and the boric acid evolved from the heated, moistened alkaline earth borate.

3. A process for producing boric acid and boric acid anhydride which consists of: moistening an alkaline earth borate material with water, heating the moistened alkaline earth borate material to temperatures within the range of 300° F. to 2000° F. in the absence of any extraneous added free acid, continuously introducing water vapor into contact with the heated borate and collecting the boron oxide and the boric acid evolved from the heated, moistened alkaline earth borate.

4. A process for producing boric acid and boric acid anhydride which consists of: moistening colemanite with water, subjecting the moistened colemanite to temperatures within the range of 300° F. to 2000° F. while in contact with water vapor and in the absence of any extraneous added free acid and collecting the boron oxide and the boric acid evolved from the heated, moistened colemanite.

5. A process for producing boric acid and boric acid anhydride which consists of: moistening an alkaline earth borate material with water, subjecting a mixture of the moistened alkaline earth borate material and between about 15% and 40% of the weight of the borate material of an oxide of the group consisting of $SiO_2$, $TiO_2$, $Al_2O_3$ and $Fe_2O_3$ to temperatures within the range of 300° F. to 2000° F. while in contact with water vapor and in the absence of any extraneous added free acid and collecting the boron oxide and the boric acid evolved from the heated, moistened alkaline earth borate.

6. A process for producing boric acid and boric acid anhydride which consists of: moistening an alkaline earth borate material with water, subjecting a mixture of the moistened earth borate material and silica in the relative proportions of about 10 parts of borate material to between 1.5 and 4 parts by weight of silica, to temperatures within the range of 300° F. to 2000° F. while in contact with water vapor and in the absence of any extraneous added free acid and collecting the boron oxide and the boric acid evolved from the heated, moistened alkaline earth borate.

7. A process for producing boric acid and boric acid anhydride which consists of: moistening a mixture of about 10 parts by weight of colemanite and 3 parts by weight of silica with water, subjecting the moistened mixture to temperatures within the range of 300° F. to 2000° F. while in contact with water vapor and in the absence of any extraneous added free acid and collecting the boron oxide and the boric acid evolved from the colemanite.

References Cited in the file of this patent

UNITED STATES PATENTS

| | | |
|---|---|---|
| 137,072 | Gutzkow | Mar. 25, 1873 |
| 1,105,388 | Weintraub | July 28, 1914 |
| 1,295,958 | Blumenberg | Mar. 4, 1919 |

OTHER REFERENCES

Mellor: "Comprehensive Treatise on Inorganic and Theoretical Chemistry," Longmans, Green and Co., New York, 1923, vol. 5, page 93.